(12) United States Patent
Pan et al.

(10) Patent No.: US 9,256,114 B2
(45) Date of Patent: Feb. 9, 2016

(54) SUPERCONTINUUM GENERATION SYSTEM

(71) Applicant: National Tsing Hua University, Hsinchu (TW)

(72) Inventors: Ci-Ling Pan, Hsinchu (TW); Alexey Zaytsev, Hsinchu (TW); Chih-Hsuan Lin, Taipei (TW); Yi-Jing You, Yilan (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 128 days.

(21) Appl. No.: 14/024,032

(22) Filed: Sep. 11, 2013

(65) Prior Publication Data

US 2014/0368900 A1    Dec. 18, 2014

(30) Foreign Application Priority Data

Jun. 18, 2013 (TW) .............................. 102121462 A

(51) Int. Cl.
*G02F 1/365* (2006.01)
*G02F 1/35* (2006.01)

(52) U.S. Cl.
CPC ........ *G02F 1/365* (2013.01); *G02F 2001/3528* (2013.01)

(58) Field of Classification Search
CPC .................. G02F 1/365; G02F 2001/3528
USPC ................. 359/326–332; 372/6, 21, 22
See application file for complete search history.

(56) References Cited

U.S. PATENT DOCUMENTS

| | | | |
|---|---|---|---|
| 5,880,877 A * | 3/1999 | Fermann et al. | 359/341.31 |
| 6,603,910 B2 * | 8/2003 | Islam et al. | 385/123 |
| 6,870,663 B2 * | 3/2005 | Kato et al. | 359/326 |
| 7,130,512 B2 * | 10/2006 | Kuksenkov et al. | 385/122 |
| 7,280,567 B2 * | 10/2007 | Luo et al. | 372/6 |
| 7,346,247 B2 * | 3/2008 | Goto et al. | 385/122 |
| 7,705,287 B2 | 4/2010 | Tanaka | |
| 7,768,691 B2 * | 8/2010 | Nerin et al. | 359/326 |
| 7,957,619 B2 | 6/2011 | Nicholson et al. | |
| 8,643,940 B2 * | 2/2014 | Kudlinski et al. | 359/326 |
| 8,861,555 B2 * | 10/2014 | Fermann et al. | 372/4 |
| 2007/0216993 A1 * | 9/2007 | Aiso et al. | 359/340 |
| 2010/0209060 A1 | 8/2010 | Inoue | |

(Continued)

FOREIGN PATENT DOCUMENTS

| CN | 202797595 U | 3/2013 |
|---|---|---|
| CN | 103022867 A | 4/2013 |

(Continued)

OTHER PUBLICATIONS

Khan, Md Saad et al., "Broadband Supercontinuum Generation with Excellent Spectral Stability from a Highly-Nonlinear Fiber using an Amplified Noiselike-Pulse Train," ECOC 2005 Proceedings, vol. 1, Paper Mo3.5.5, pp. 61-62.*

*Primary Examiner* — Daniel Petkovsek
(74) *Attorney, Agent, or Firm* — Muncy, Geissler, Olds & Lowe, P.C.

(57) ABSTRACT

A supercontinuum generation system comprises a noise-like pulse fiber laser structure, an amplification unit and a broadening medium. The noise-like pulse fiber laser structure generates at lease one noise-like pulse of the wavelength less than 1300 nm. The amplification unit includes a gain fiber with which the noise-like pulse is coupled. The broadening medium is coupled with the gain fiber. A supercontinuum is generated when the noise-like pulse is amplified by the amplification unit and broadened in spectrum by the broadening medium.

9 Claims, 6 Drawing Sheets

(56) References Cited

U.S. PATENT DOCUMENTS

2012/0281720 A1　11/2012　Fermann et al.
2013/0188240 A1*　7/2013　Shaw et al. .................. 359/326

FOREIGN PATENT DOCUMENTS

| CN | 202995205 U | 6/2013 |
| TW | 201111890 | 4/2011 |

* cited by examiner

SUPERCONTINUUM GENERATION SYSTEM

CROSS REFERENCE TO RELATED APPLICATIONS

This Non-provisional application claims priority under 35 U.S.C. §119(a) on Patent Application No(s). 102121462 tiled in Taiwan, Republic of China on Jun. 18, 2013, the entire contents of which are hereby incorporated by reference.

BACKGROUND OF THE INVENTION

1. Field of Invention

The invention relates to a supercontinuum generation system.

2. Related Art

First observed in 1970, a supercontinuum is generated when an optical pulse with high energy intensity and a narrow spectrum is largely broadened in spectrum by passing through an optical device of stronger nonlinear effects. If the pulse energy required to generate a supercontinuum can be decreased, this kind of white light source generated by the supercontinuum can be applied to the measuring of biology, chemistry and material due to the natural coherence and high base-mode luminance. Because the white-like LED source generated by mixing two complementary lights is not a continuous spectrum and the fluorescent lamp is heavier and not adaptable sufficiently, the white light source generated in the supercontinuum manner is obviously a promising light source in the future.

The supercontinuum is generated by the cooperation of multiple optical nonlinear effects. The current research mainly focuses on decreasing the least average input power required to generate the supercontinuum on the premise that the output spectrum is broadened sufficiently. To achieve this goal, there are two aspects needed to be improved. One aspect is to confine the inputted energy of the light source to a narrower pulse to achieve the higher transient light intensity. The other aspect is to use the optical device with stronger nonlinear effects. The supercontinuum generated by such methods usually appears in the anomalous dispersion region.

To confine the inputted energy of the light source to a narrower pulse, an amplified femtosecond laser is required, and currently the Ti:Sapphire laser is the most frequently used. However, Ti:Sapphire is too big and expensive. Besides, the optical devices with stronger nonlinear effects also result in the problem of the higher cost.

Therefore, it is an important subject to provide a supercontinuum generation system that can generate a supercontinuum in an easier method without using femtosecond laser.

SUMMARY OF THE INVENTION

In view of the foregoing subject, an objective f the invention is to provide a supercontinuum generation system that can generate a supercontinuum in an easier method without using femtosecond laser.

To achieve the above objective, a supercontinuum generation system according to the invention comprises a noise-like pulse fiber laser structure, an amplification unit and a broadening medium. The noise-like pulse fiber laser structure generates at lease noise-like pulse of the wavelength less than 1300 nm. The amplification unit includes a gain fiber with which the noise-like pulse is coupled. The broadening medium is coupled with the gain fiber. A supercontinuum is generated when the noise-like pulse is amplified by the amplification unit and broadened in spectrum by the broadening medium.

In one embodiment, the noise-like pulse fiber laser structure includes an Yb-doped fiber, a diaphragm and a grating pair.

In one embodiment, the amplification unit further includes a fiber collimator, a pump light source and a power combiner, the fiber collimator collimates the noise-like pulse outputted by the noise-like pulse fiber laser structure to output it to the power combiner, the pump light source emits a pump light to the power combiner, and the power combiner transmits the collimated noise-like pulse to the gain fiber.

In one embodiment, the pump light source includes at least a laser diode.

In one embodiment, the supercontinuum generation system further comprises an optical isolator, which is coupled with the noise-like pulse fiber laser structure and the amplification unit.

In one embodiment, the gain fiber includes an Yb-doped fiber.

In one embodiment, the broadening medium includes a single mode fiber (SMF), highly nonlinear fiber (HNLF) or nonlinear crystal.

In one embodiment, the bandwidth of the supercontinuum is greater than 100 nm.

In one embodiment, the supercontinuum appears in the positive dispersion region.

In one embodiment, the wavelength of the supercontinuum ranges between 1000 nm and 1300 nm.

As mentioned above, in the supercontinuum generation system according to the invention, the noise-like pulse fiber laser structure generates a noise-like pulse having the center wavelength less than 1300 nm, which is within the positive dispersion region. Besides, the noise-like pulse is amplified by the amplification unit and broadened in spectrum by the broadening medium to generate a supercontinuum. Furthermore, the generated supercontinuum is also within the positive dispersion region.

In sum, the supercontinuum generated by the supercontinuum generation system of the invention can be applied not only to the optical transmission field to function as the wavelength-adjustable light source, white light source or the gas detector, but also to the medical display field to function as the optical coherent tomography (OCT), for example.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
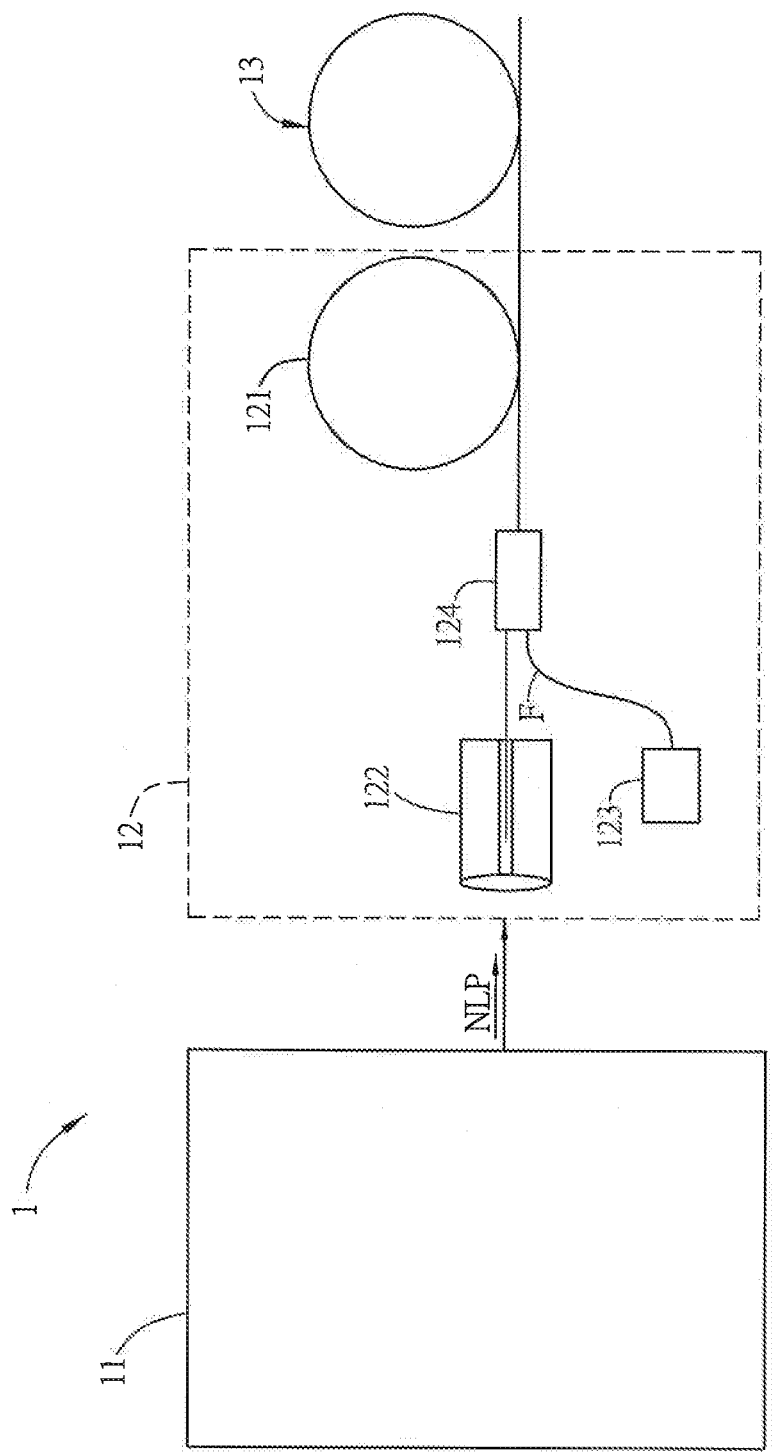
FIG. 1 is a schematic diagram of a supercontinuum generation system according to an embodiment of the invention.

FIG. 1 is a schematic diagram of a supercontinuum generation system according to an embodiment of the invention. As shown in FIG. 1, the supercontinuum generation system 1 includes a noise-like pulse fiber laser structure 11, an amplification unit 12 and a broadening medium 13. The noise-like pulse fiber laser structure 11 is used to generate noise-like pulse NLP having a wavelength less than 1300 nm. In general, the region corresponding to the center wavelength less than 1300 nm is called a positive dispersion region. In this embodiment, the supercontinuum is generated by using the noise-like pulse NLP having the center wavelength less than 1300 nm, so the supercontinuum is generated in the positive dispersion region. Besides, the supercontinuum is defined as with the wavelength greater than 60 nm.

Preferably, the amplification unit 12 includes a gain fiber 121, and the noise-like pulse NLP is coupled with the gain fiber 121. The amplification unit 12 further includes a fiber collimator 122, a pump light source 123 and a power combiner 124. The fiber collimator 122 receives the noise-like pulse NLP outputted by noise-like pulse fiber laser structure 11, and collimates the noise-like pulse NLP to output it to the power combiner 124.

The pump light source 123 can include one or more laser diodes to emit a pump light. In this embodiment the pump power of the pump light source 123 can have a range of 4 W~13 W. Herein for example, the pump power is 13 W, and the wavelength of the pump light is 915 nm. The pump light source 123 emits the pump light to the power combiner 124.

In detail, the noise-like pulse NLP collimated by the fiber collimator 122 and the pump light outputted by the pump light source 123 are transmitted to the power combiner 124 through the passive fiber F. The passive fiber F has an inner diameter of 10 microns and an outer diameter of 125 microns. Then, the power combiner 124 can combine the pump light and collimated noise-like pulse NLP to output them to the gain fiber 121.

The collimated noise-like pulse NLP combined with the pump light can obtain an energy gain, i.e. amplification, during the transmission within the gain fiber 121. The gain fiber 121 can include an Yb-doped fiber or other fibers doped otherwise, depending on the type of the pump light source. In this embodiment, the Yb-doped fiber is used as the gain fiber 121, preferably with a length of 2 m. The Yb-doped fiber can include a double cladding structure, and the core thereof is doped with Yb, a rare earth element, for increasing the gain effect. For the Yb-doped fiber, it isn't easily influenced by the temperature when combined with the pump light of 915 nm. Therefore, since the wavelength of the pump light is related to the material of the gain fiber 121, the invention is not limited to the pump light of 915 nm.

The broadening medium 13 is coupled with the gain fiber 121 to receive the noise-like pulse NLP amplified by the gain fiber 121, and broadens the bandwidth of the noise-like pulse NLP. In general, the broadening medium has less dispersion and thus has a longer transmission distance, and therefore can broaden the bandwidth of the pump light. However, the broadening medium 13 only can receive the nonlinear pump light or approximately single-beam pump light. The broadening medium 13 can include a single mode fiber (SMF), highly nonlinear fiber (HNLF) or nonlinear crystal, and here the signal mode fiber is used for example. Therefore, after receiving the noise-like pulse NLP that is amplified by the gain fiber 121 of the amplification unit 12 and is nonlinear (approximately single-beam), the broadening medium 13 can broaden the bandwidth of the noise-like pulse NLP to generate a supercontinuum SC (referring to FIG. 4A first).

Figure 2:
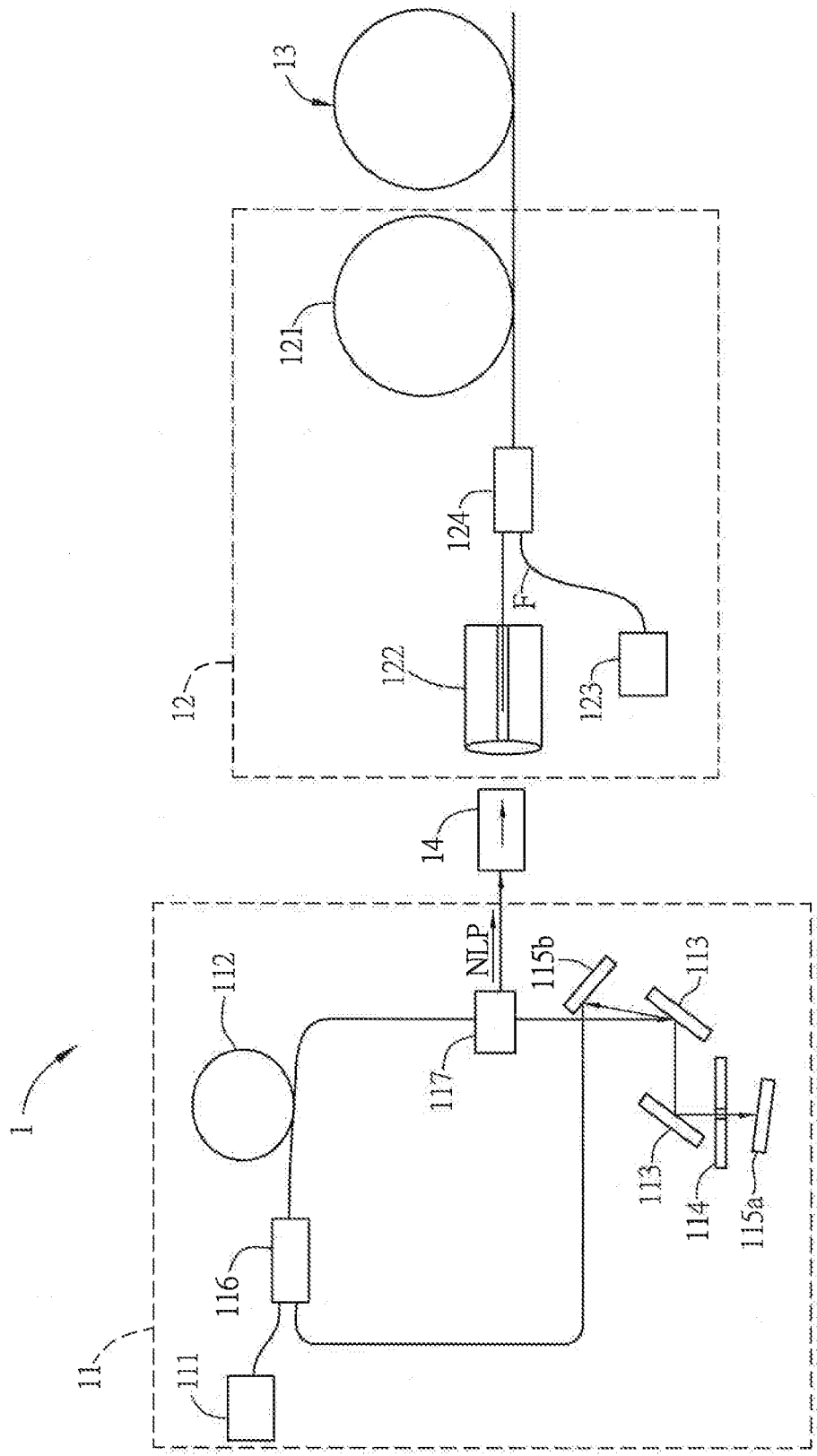
FIG. 2 is a schematic diagram of a supercontinuum generation system according to another embodiment of the invention.

FIG. 2 is a schematic diagram of a supercontinuum generation system according to another embodiment of the invention. As shown in FIG. 2, the supercontinuum generation system 1 further includes an optical isolator 14, which is coupled with the noise-like pulse fiber laser structure 11 and the amplification unit 12 and is disposed therebetween. The optical isolator 14 receives the noise-like pulse NLP from the noise-like pulse fiber laser structure 11, and transmits the noise-like pulse NLP to the amplification unit 12. The optical isolator 14 can prevent the noise-like pulse NLP from being reflected back to the noise-like pulse fiber laser structure 11, and thus can avoid the damage of the components of the noise-like pulse fiber laser structure 11.

As shown in FIG. 2, the noise-like pulse fiber laser structure 11 is preferably designed according to a mode-locked laser ring cavity and can generate the noise-like pulse NLP. The noise-like pulse fiber laser structure 11 includes a pump light source 111, an Yb-doped fiber 112, a grating pair 113, a diaphragm 114 and two reflective elements 115a and 115b. The pump light source 111 emits a pump light that is coupled with the Yb-doped fiber 112 and then to the grating pair 113. The diaphragm 114 has an aperture. The light transmitted by the grating pair 113 partially passes through the aperture and is then transmitted to the reflective element 115a to become a reflective light. The reflective light will pass through the aperture again and is transmitted by the grating pair 113 and reflective element 115b to be coupled back to the ring resonance path. Herein, the two gratings of the grating pair 113 have an interval of 10.5 cm, and the number of the slits of the grating pair 113 is 600/mm, for example. Accordingly, the pump light becomes the noise-like pulse NLP with the high pulse energy and the wavelength less than 1300 nm through the ring resonance path, Yb-doped fiber 112, grating pair 113 and diaphragm 114. Besides, the output power of the pump power of the pump light source 111 can be controlled to the range of 4~13 W and the corresponding output power of the noise-like pulse NLP is 0.1~1.45 W.

The noise-like pulse fiber laser structure 11 further includes a power combiner 116, which can receive the pump light of the pump light source 111 and the feedback signal that is amplified in power to output them after combining them. The noise-like pulse fiber laser structure 11 further includes a polarizing beam splitter 117, which is disposed between the Yb-doped fiber 112 and the grating pair 113 to output the noise-like pulse NLP.

In detail, on the optical path, the grating pair 113 is coupled with a part of the pump light that is split by the polarizing beam splitter 117 to reduce the dispersion and provide the NGVD (negative group velocity dispersion). After subjected to the effect of the grating pair 113, the beams of different wavelengths will have different emission angles. Therefore, the position of the diaphragm 114 on the plane perpendicular to the optical path can be adjusted to determine the center wavelength of the noise-like pulse NLP outputted by the noise-like pulse fiber laser structure 11 that passes through the aperture. In other words, the center wavelength of the pump light outputted by the noise-like pulse fiber laser structure ii can be selected by adjusting the position of the diaphragm 114 on the plane perpendicular to the optical path.

Figure 3A:
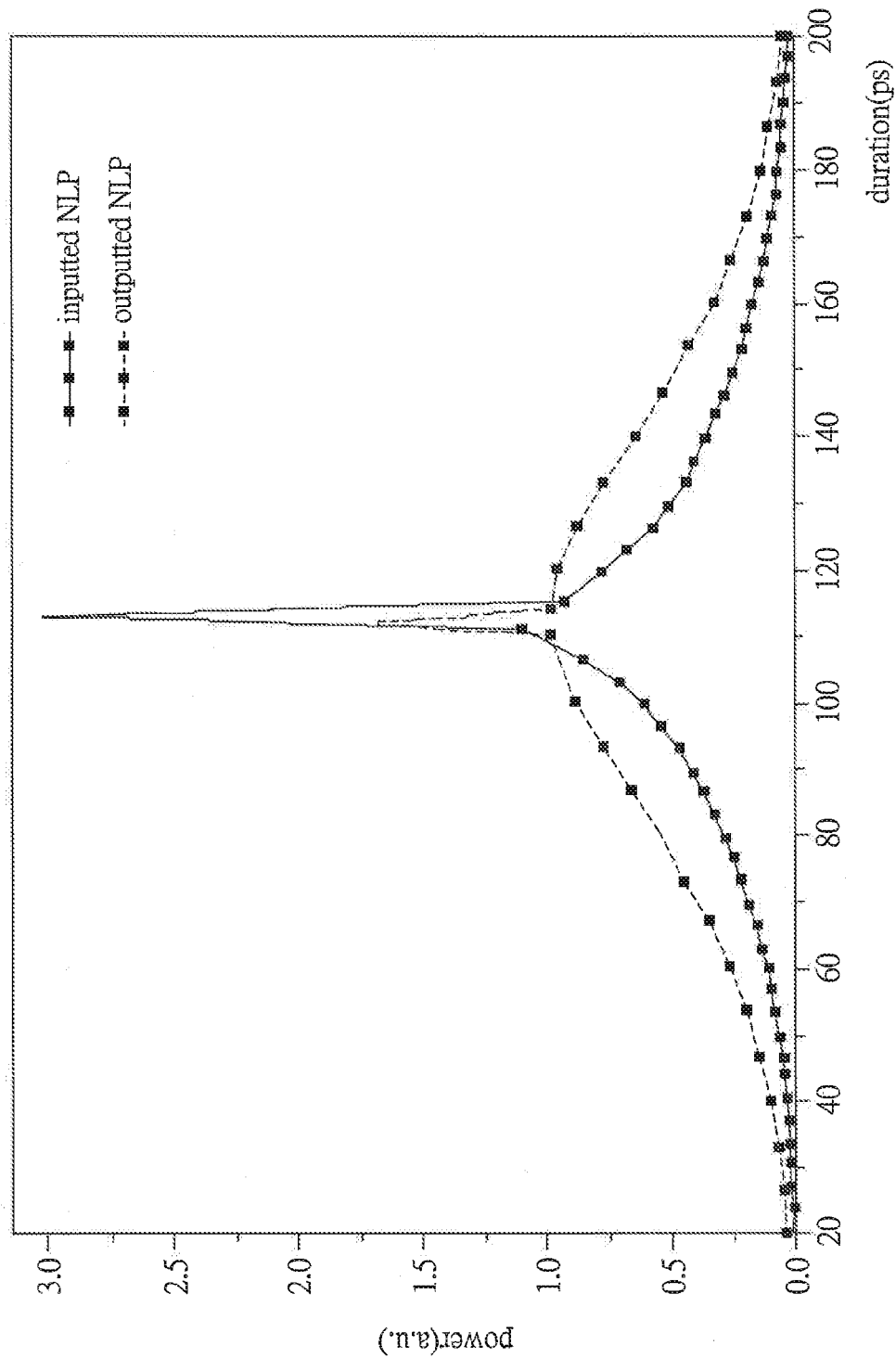
FIG. 3A is a schematic curve diagram of the intensity autocorrelation of the noise-like pulse generated by the supercontinuum generation system in FIG. 2.

FIG. 3A is a schematic curve diagram of the intensity autocorrelation of the noise-like pulse generated by the supercontinuum generation system in FIG. 2. As shown in FIG. 3A, the solid line represents the inputted noise-like pulse NLP, i.e. the 1 W noise-like pulse NLP outputted by the noise-like pulse fiber laser structure 11, for generating the supercontinuum, and the dotted line represents the outputted noise-like pulse NLP from the supercontinuum generation system, and the outputted noise-like pulse NLP is generated by the coupling of the 1 W noise-like pulse NLP with the optical isolator 14, amplification unit 12 and broadening medium 13 sequentially. In general, when the inputted pulse and outputted pulse have similar characteristics, the supercontinuum can be generated more easily. Accordingly, it can be seen from FIG. 3A that the bandwidths at the peak of the inputted pulse and outputted pulse are similar to each other in addition to the narrower bandwidth, so the supercontinuum in the invention can be generated more easily.

Figure 3B:
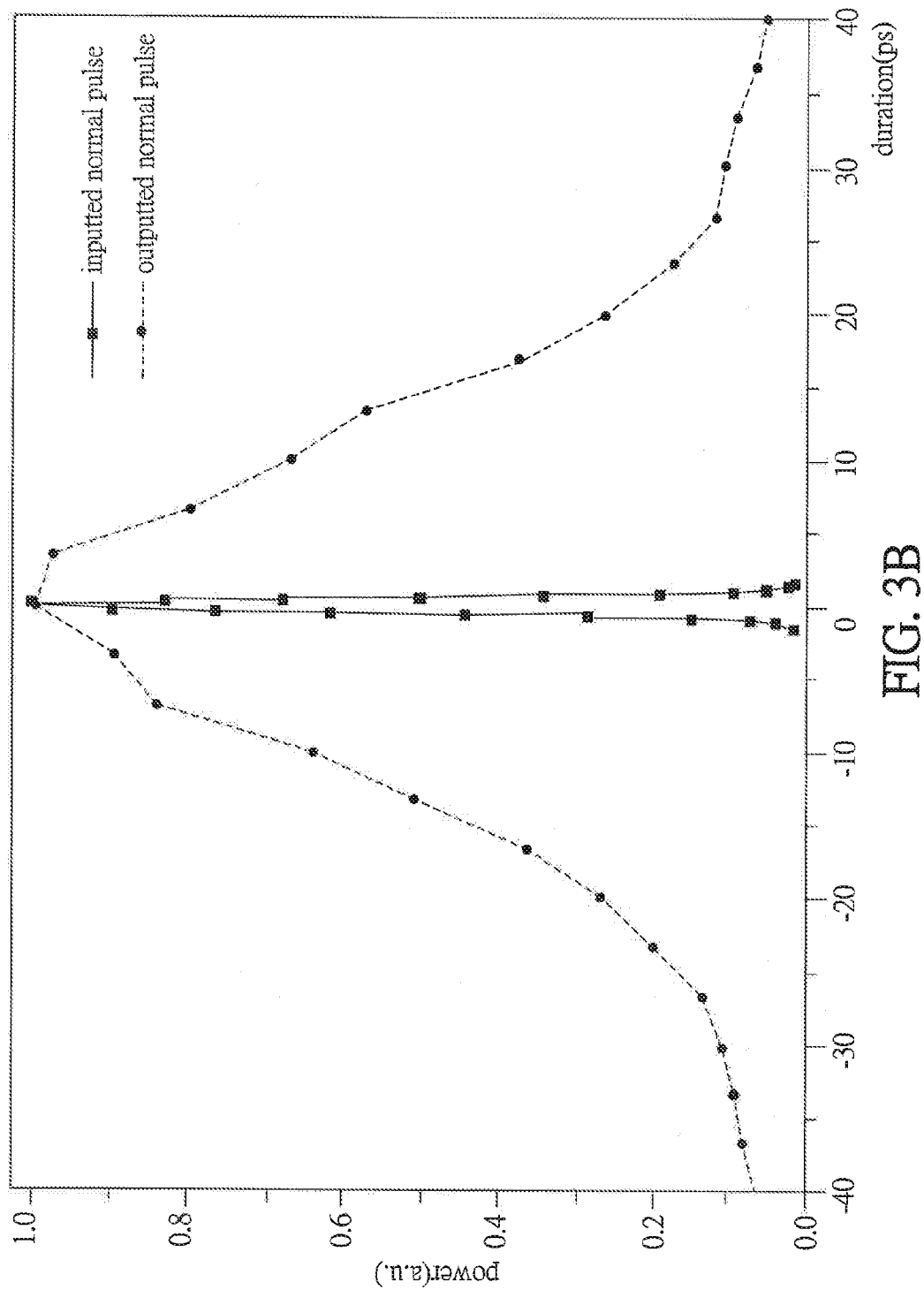
FIG. 3B is a schematic curve diagram of the intensity autocorrelation of the normal pulse.

In comparison with FIG. 3A, FIG. 3B is a schematic curve diagram of the intensity autocorrelation of the normal pulse. In FIG. 3B, the solid line represents the 1 W normal pulse (Gaussian pulse) outputted by a noise-like pulse fiber laser structure or other kinds of fiber laser structure, and the dotted line represents the outputted normal pulse that is generated by the coupling of the 1 W normal pulse with the optical isolator 14, amplification unit 12 and broadening medium 13 sequentially. It can be known by comparing FIGS. 3A and 3B that the bandwidth of the noise-like pulse NLP is almost unchanged after coupled with the amplification unit 12 and broadening medium 13, so the change of the bandwidth of the amplified and broadened noise-like pulse NLP is much less than that of the amplified and broadened normal pulse.

Figure 4A:
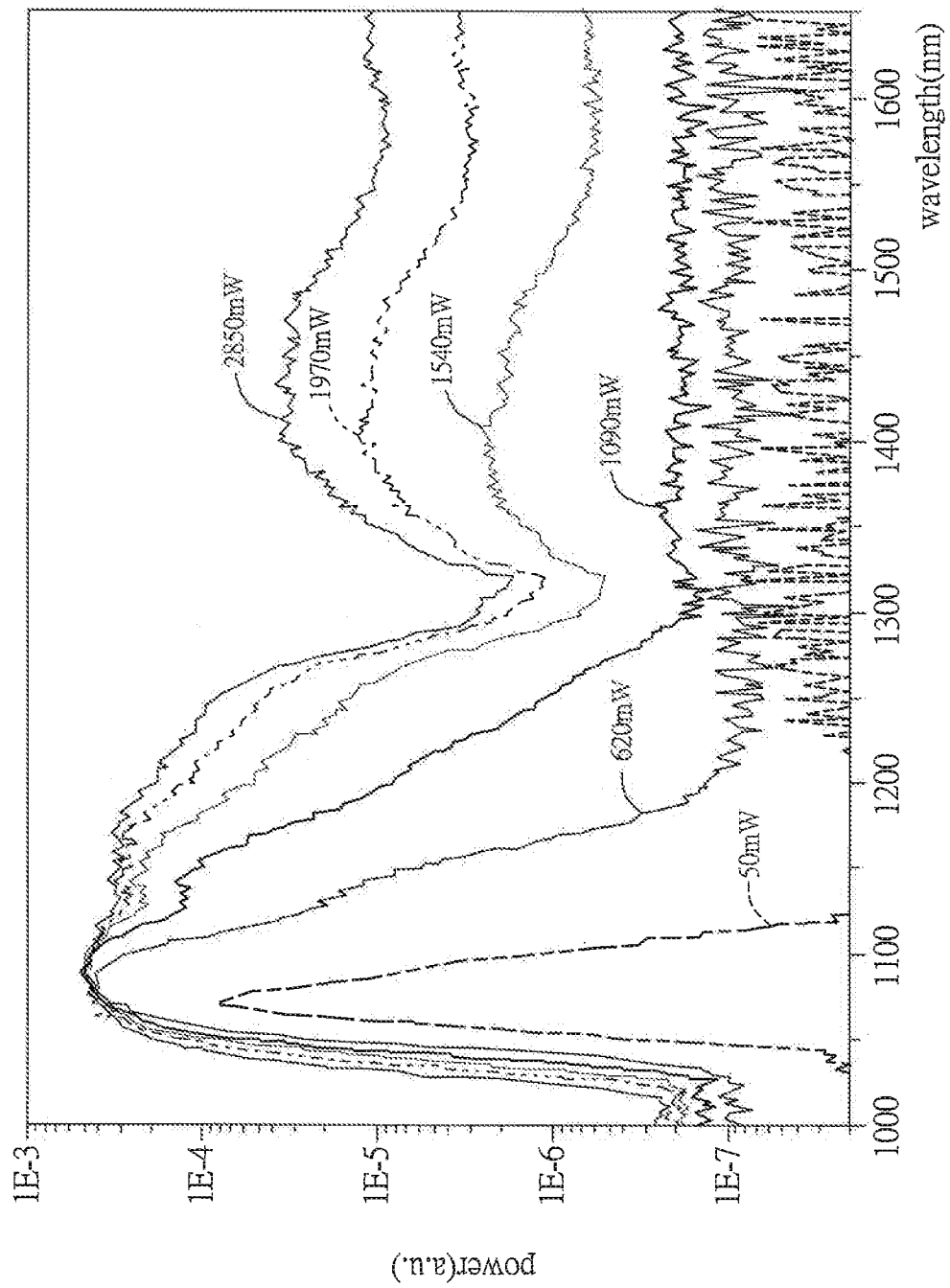
FIG. 4A is a schematic diagram showing the output spectrums of the supercontinuum generated by the supercontinuum generation system receiving the noise-like pulses of different powers.
Figure 4B:
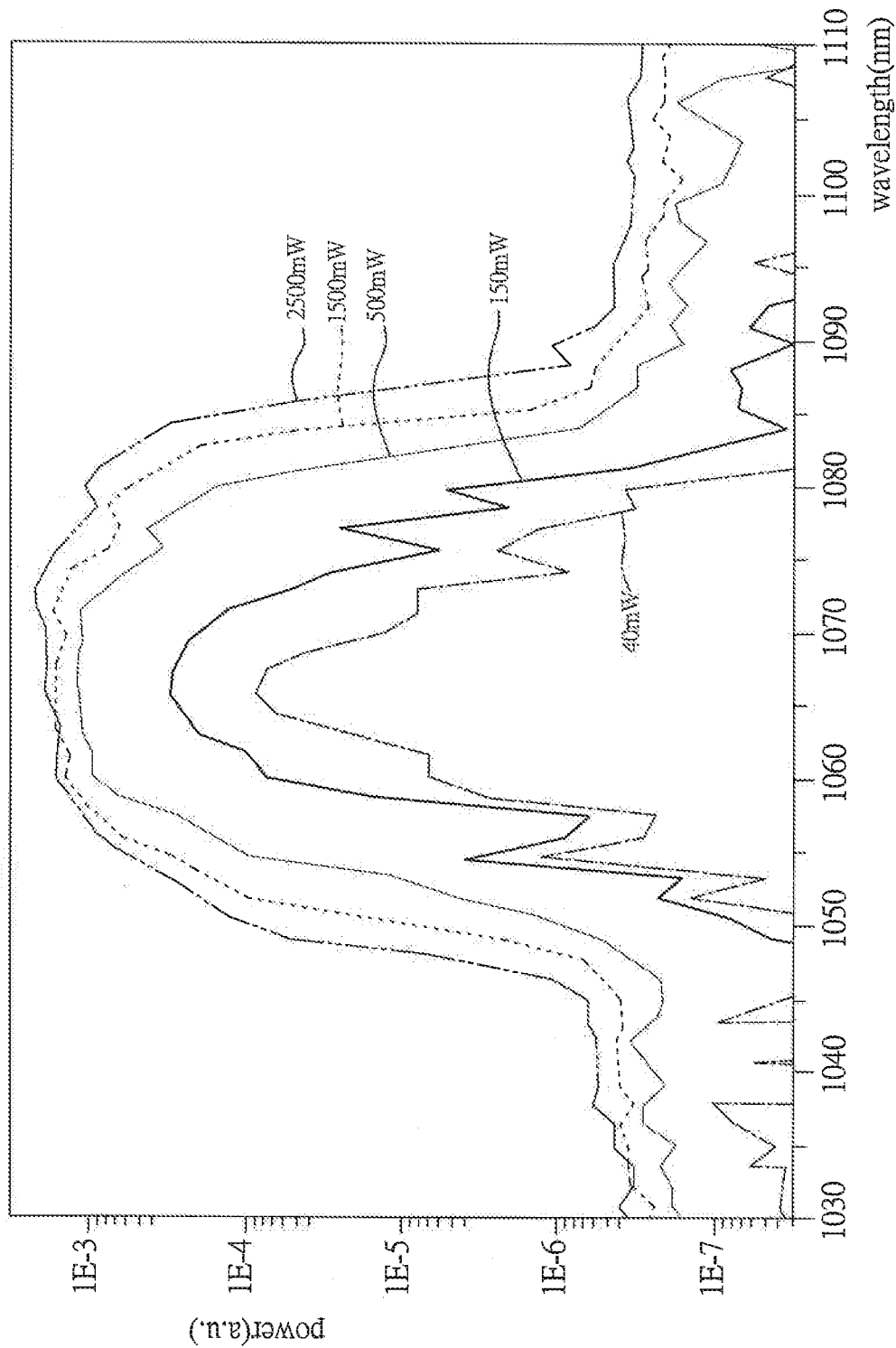
FIG. 4B is a schematic diagram showing the output spectrums of the supercontinuum generated by the supercontinuum generation system receiving the normal pulses of different powers.

FIG. 4A is a schematic diagram showing the output spectrums of the supercontinuum generated by the supercontinuum generation system receiving the noise-like pulses of different powers, and FIG. 4B is a schematic diagram showing the output spectrums of the supercontinuum generated by the supercontinuum generation system receiving the normal pulses of different powers. The output spectrums of the supercontinuum in FIG. 4A are respectively generated by the couplings of the 50 mW, 620 mW, 1090 mW, 1540 mW, 1970 mW and 2850 mW noise-like pulses NLP outputted by the noise-like pulse fiber laser structure 11 with the optical isolator 14, amplification unit 12 and broadening medium 13 sequentially. In general, the supercontinuum can be called when the bandwidth of the spectrum thereof is greater than 100 nm. From the spectrum generated by the noise-like pulse NLP of the least output power (50 mW) in FIG. 4A, the supercontinuum generation system the invention can generate the supercontinuum having the bandwidth greater than 100 nm and mainly generate the supercontinuum having the bandwidth between 200 nm and 300 nm. Besides, when the noise-like pulse NLP has higher power, the generated supercontinuum can have a broader spectrum. Furthermore, the wavelength of the supercontinuum generated by the supercontinuum generation system 1 mainly ranges between 1000 nm and 1300 nm and is less than 1300 nm, and that is, the supercontinuum is generated appearing in the positive dispersion region. Therefore, the supercontinuum generation system 1 of the invention can generate, according to the noise-like pulse NLP of the positive dispersion region i.e. the wavelength less than 1300 nm), the supercontinuum appearing in the positive dispersion region.

The output spectrums of the supercontinuum in FIG. 4B are respectively generated by the couplings of the 40 mW, 150 mW, 500 mW, 1500 mW and 2500 mW normal pulses (Gaussian pulses) with the optical isolator 14, amplification unit 12 and broadening medium 13 sequentially. It can be seen from the spectrums in FIG. 4B that the bandwidth is just 30 nm, being unable to generate the supercontinuum.

In summary, in the supercontinuum generation system according to the invention, the noise-like pulse fiber laser structure generates a noise-like pulse having the center wavelength less than 1300 nm, which is within the positive dispersion region. Besides, the noise-like pulse is amplified by the amplification unit and broadened in spectrum by the broadening medium to generate a supercontinuum. Furthermore, the generated supercontinuum is also within the positive dispersion region.

In sum, the supercontinuum generated by the supercontinuum generation system of the invention can be applied not only to the optical transmission field to function as the wavelength-adjustable light source, white light source or the gas detector, but also to the medical display field to function as the optical coherent tomography (OCT), for example.

Although the invention has been described with reference to specific embodiments, this description is not meant to be construed in a limiting sense.

Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A supercontinuum generation system, comprising:
a noise-like pulse fiber laser structure generating at least one noise-like pulse of the center wavelength less than 1300 nm;
an amplification unit including a gain fiber with which the noise-like pulse is coupled; and
a broadening medium coupled with the gain fiber, wherein a supercontinuum is generated when the noise-like pulse is amplified by the amplification unit and broadened in spectrum by the broadening medium,
wherein the gain fiber includes an Yb-doped fiber.

2. The supercontinuum generation system as recited in claim 1, wherein the noise-like pulse fiber laser structure includes an Yb-doped fiber, a diaphragm and a grating pair.

3. The supercontinuum generation system as recited in claim 1, wherein the amplification unit further includes a fiber collimator, a pump light source and a power combiner, the fiber collimator collimates the noise-like pulse outputted by the noise-like pulse fiber laser structure to output it to the power combiner, the pump light source emits a pump light to the power combiner, and the power combiner transmits the collimated noise-like pulse to the gain fiber.

4. The supercontinuum generation system as recited in claim 3, wherein the pump light source includes at least a laser diode.

5. The supercontinuum generation system as recited in claim 1, further comprising:
an optical isolator coupled with the noise-like pulse fiber laser structure and the amplification unit.

6. The supercontinuum generation system as recited in claim 1, wherein the broadening medium includes a single mode fiber (SMF), nonlinear fiber or nonlinear crystal.

7. The supercontinuum generation system as recited in claim 1, wherein the bandwidth of the supercontinuum is greater than 100 nm.

8. The supercontinuum generation system as recited in claim 1, wherein the supercontinuum appears in the positive dispersion region.

9. The supercontinuum generation system as recited in claim 1, wherein the wavelength of the supercontinuum ranges between 1000 nm and 1300 nm.

* * * * *